Jan. 24, 1956

R. G. STERN 2,731,737

AIRCRAFT TRAINING APPARATUS FOR SIMULATING
LANDING AND RELATED MANEUVERS

Filed Dec. 23, 1949

INVENTOR.
ROBERT G. STERN

BY his ATTORNEY.

Jan. 24, 1956

R. G. STERN 2,731,737

AIRCRAFT TRAINING APPARATUS FOR SIMULATING
LANDING AND RELATED MANEUVERS

Filed Dec. 23, 1949

INVENTOR.
ROBERT G. STERN his ATTORNEYS

Fig. 5

INVENTOR.
ROBERT G. STERN

Jan. 24, 1956

R. G. STERN

2,731,737

AIRCRAFT TRAINING APPARATUS FOR SIMULATING
LANDING AND RELATED MANEUVERS

Filed Dec. 23, 1949

INVENTOR.
ROBERT G. STERN

BY *Orin R. Severn* his ATTORNEY.

United States Patent Office 2,731,737
Patented Jan. 24, 1956

2,731,737

AIRCRAFT TRAINING APPARATUS FOR SIMULATING LANDING AND RELATED MANEUVERS

Robert G. Stern, Caldwell, N. J., assignor to Curtiss-Wright Corporation, a corporation of Delaware Application December 23, 1949, Serial No. 134,623

26 Claims. (Cl. 35—12)

This invention relates to aircraft training apparatus, particularly to grounded training apparatus for simulating landing and related maneuvers of aircraft including takeoff and runway maneuvers, and its principal object is to provide improved aircraft training apparatus of the above type that operates consistently with aerodynamic principles and is realistic for simulating the aforesaid maneuvers.

A further object of the invention is to provide improved aircraft training apparatus for simulating runway and taxi maneuvers of large multi-engine aircraft having conventional equipment such as steerable nose wheel, individually operable wheel brakes, etc., ordinarily used in ground maneuvering.

Although grounded aircraft training apparatus has been used for simulating flight maneuvers including aerobatics, this type of training apparatus has heretofore been unrealistic in its simulation of landing and related maneuvers. In general, the student pilot in using such apparatus relies on his altimeter to represent grounding of the aircraft, whereas on takeoff he simply advances the throttle and pulls back on the stick to gain altitude for representing the airborne condition. The artificial horizon and other flight indicating instruments in the meantime behave as in flight, since no ground sensing means are provided for distinguishing between the simulated grounded and airborne conditions. Thus, when the aircraft is represented by the altimeter as being on the runway, erroneous and misleading pitch and roll indications, for example, due to control manipulation by the student, are possible. It will therefore be apparent that realistic ground sensing means for controlling the flight indicating instruments during landing, takeoff and runway maneuvers, when the simulated position of the aircraft is on or very close to the ground is not only highly desirable but essential for training pilots, particularly in the operation of large multi-engine aircraft.

In accordance with the present invention, flight computing apparatus responsive to simulated aircraft controls operable by the student is arranged to represent various flight conditions, such as air speed, angle of attack, angle of pitch, etc., and to simulate landing and takeoff conditions by comparing simulated aerodynamic lift, which is a manifestation of airspeed, and aircraft weight with reference to the altitude indication. Specifically, when lift exceeds weight, the aircraft is represented as airborne and the flight indicating instruments are fully operative and responsive to the controls, and when weight exceeds lift concurrent with a ground contact indication, certain flight instruments are either disabled or limited in operation so that the aircraft is represented as being on the ground. Takeoff wherein the airspeed gradually increases and the nose wheel rises while the main wheels are still on the runway is realistically simulated by the pitch indicator in combination with other elements of the computing apparatus. In the grounded condition, simulation of normal taxi operations, such as steering by means of the nose wheel or by means of the main wheel brakes and engines, or both, is also possible with the present invention.

The invention will be more fully set forth in the following description referring to the accompanying drawings, and the features of novelty will be pointed out with particularity in the claims annexed to and forming a part of this specification.

Referring to the drawings.

Figure 1:
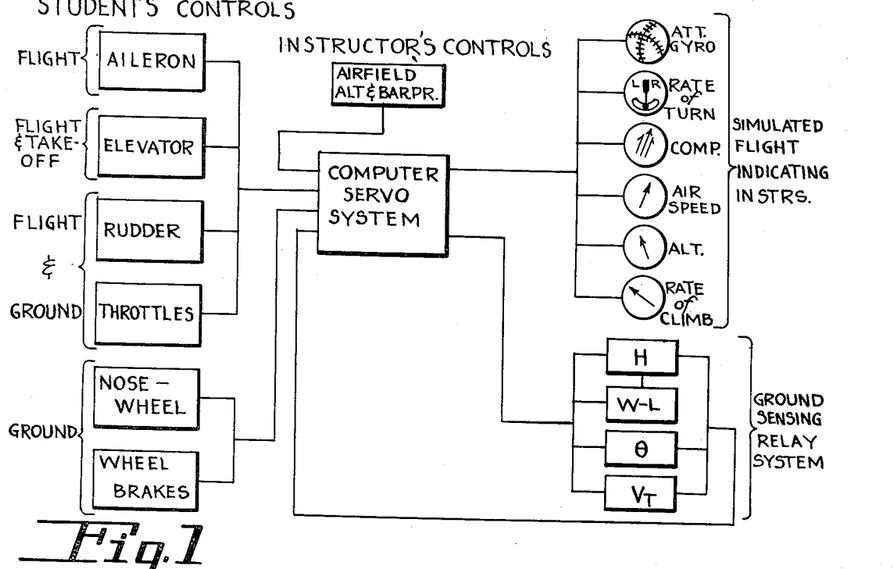
Fig. 1 is a block schematic illustration of component parts of the aircraft training system embodying the present invention.
Figure 2:
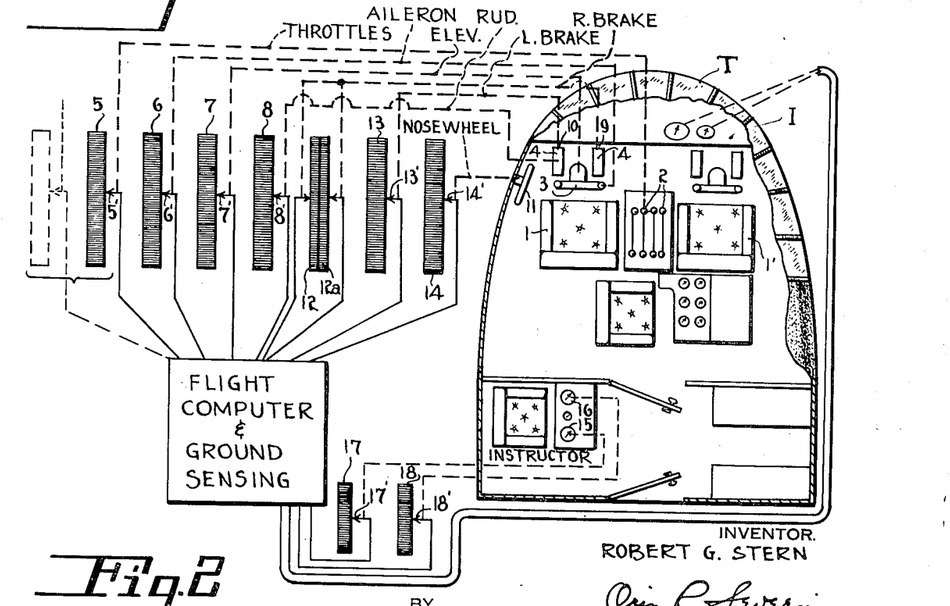
Fig. 2 is a partly schematic illustration of a grounded flight trainer and associated control apparatus of the invention.

Fig. 1 illustrates a block schematic layout of essential elements of the training apparatus embodying the present invention in order to show the general relationship of the simulated ground sensing system, the simulated aircraft controls, computing means and simulated flight indicating instruments. Fig. 2, which also is a schematic illustration of the aircraft trainer and associated apparatus, is intended to supplement Fig. 1 in this respect. In these drawings, no attempt is made to indicate specific connections between the various elements of the ground sensing system, computing means and simulated flight instruments, such disclosure being made in subsequent figures.

Referring first to Fig. 1, the essential input controls for the system are indicated as related to conventional flight controls, namely aileron, elevator, rudder and throttle, and the ground controls are indicated as associated with the nose wheel and wheel brakes. Certain of the simulated flight controls, namely the elevator, rudder and throttle are also used to control movement of the aircraft on the ground or at takeoff, whereas the simulated nose wheel and wheel brakes are operable only on the ground to control movement of the aircraft in the usual manner. The elevator, for example, functions prior to actual takeoff to lift the nose wheel from the runway so as to increase pitch and angle of attack. When the aircraft is represented as being in the three-point grounded position, the simulated rudder and throttle controls can be used in conventional manner in combination with the simulated steerable nose wheel and individually operable wheel brakes to guide, turn and decelerate the aircraft in taxi maneuvers. Realistic simulation is further obtained by cutting out the nose wheel control once the nose wheel has lifted on takeoff, and also by cutting the brake control when altitude increase is indicated, i. e., when the aircraft is represented as airborne.

The instructor's controls are concerned with the simulated altitude of the airfield and the simulated barometric pressure thereat for introducing variables in the problems to be solved by the student. As indicated in Fig. 2, each of the student's and instructor's controls is operatively connected to means such as a potentiometer for deriving a control voltage or voltages in a manner hereinafter described.

The flight computer system is of the electrical type involving a plurality of interconnected and interacting servo systems that are responsive to the aforesaid derived input voltages, and operates generally in the manner of the flight computing system disclosed and claimed in a co-pending application, Serial No. 429,314, dated May 12, 1954, which is a continuation of Serial No. 777,414, filed October 2, 1947, by R. C. Dehmel for "Flight Computing System and Apparatus," now abandoned. The simulated flight indicating instruments are in turn responsive to the operation respectively of certain of the aforesaid servo systems of the computer so as to represent various flight conditions produced by the student's manipulation of the controls.

The ground sensing system which modifies the operation of the flight indicating instruments through the computer servos when landing and takeoff maneuvers are simulated includes in general a plurality of relays that are controlled by the computer servos according to simulated flight conditions, including altitude with respect to the airfield (H), the difference between aerodynamic lift and aircraft weight (W−L), the pitch attitude ($\theta$) of the aircraft, and true airspeed (V$_T$) respectively. The H and W−L relays are interrelated as indicated so that operation of the H relay is dependent on operation of the W−L relay. In this manner, the H relay, which controls certain of the servo systems to modify instrument operation, can represent a landing condition, for example, when aircraft weight exceeds lift and the altitude is that of the runway. When simulated airspeed and angle of attack ($\alpha$) are increased on takeoff so that lift exceeds weight, the W−L relay controls the ground sensing system so that the airborne condition is simulated and normal flight operation of all indicatcing instruments is permitted. The ($\theta$) and V$_T$ relays function according to simulated pitch and airspeed respectively during landing and takeoff, the $\theta$ relay for preventing indication of negative pitch when the runway altitude is reached thereby limiting $\theta$ to the three-point ground position, and V$_T$ relay in combination with the H relay for modifying the operation of the servo system representing yaw to simulate engine, brake and nose wheel operation on the ground and at takeoff.

Referring to Fig. 2, the trainer fuselage T comprising the pilot's station is shown schematically in plan view with reference to the associated computing and control equipment of the present invention. The trainer per se may be of any suitable type having pilot's and co-pilot's seats 1 and 1' and simulated aircraft controls including throttles 2, a stick or control column 3 and rudder pedals 4. The respective throttle, aileron, elevator and rudder controls are operatively connected as diagrammatically indicated to voltage deriving means such as potentiometers 5, 6, 7 and 8 having coacting movable contacts 5', 6', 7' and 8' respectively. A single throttle potentiometer is illustrated in the interest of simplicity, it being understood that the invention is equally applicable to multi-engine aircraft as indicated. Simulated right and left wheel brake and steerable nose wheel controls are indicated at 9, 10 and 11 respectively and these controls are connected to corresponding potentiometers 12, 13 and 14 having movable contacts 12', 13' and 14' respectively. The instructor's controls 15 and 16 are connected to potentiometers 17 and 18 for positioning the respective contacts 17' and 18' for simulating altitude and barometric pressure at the airfield. The essential instruments on the instrument panel I are suitably operated from the flight computer system as indicated. The potentiometer contacts may be positioned for voltage derivation according to respective aircraft control operation in the manner illustrated for example in Dehmel Patent 2,336,603, granted January 2, 1945, for "Aircraft Training Apparatus." It shall be understood that the invention is also applicable to other types of trainers such as those mounted for rotation in azimuth, without reference to the particular kind of operating medium used.

Figure 3:
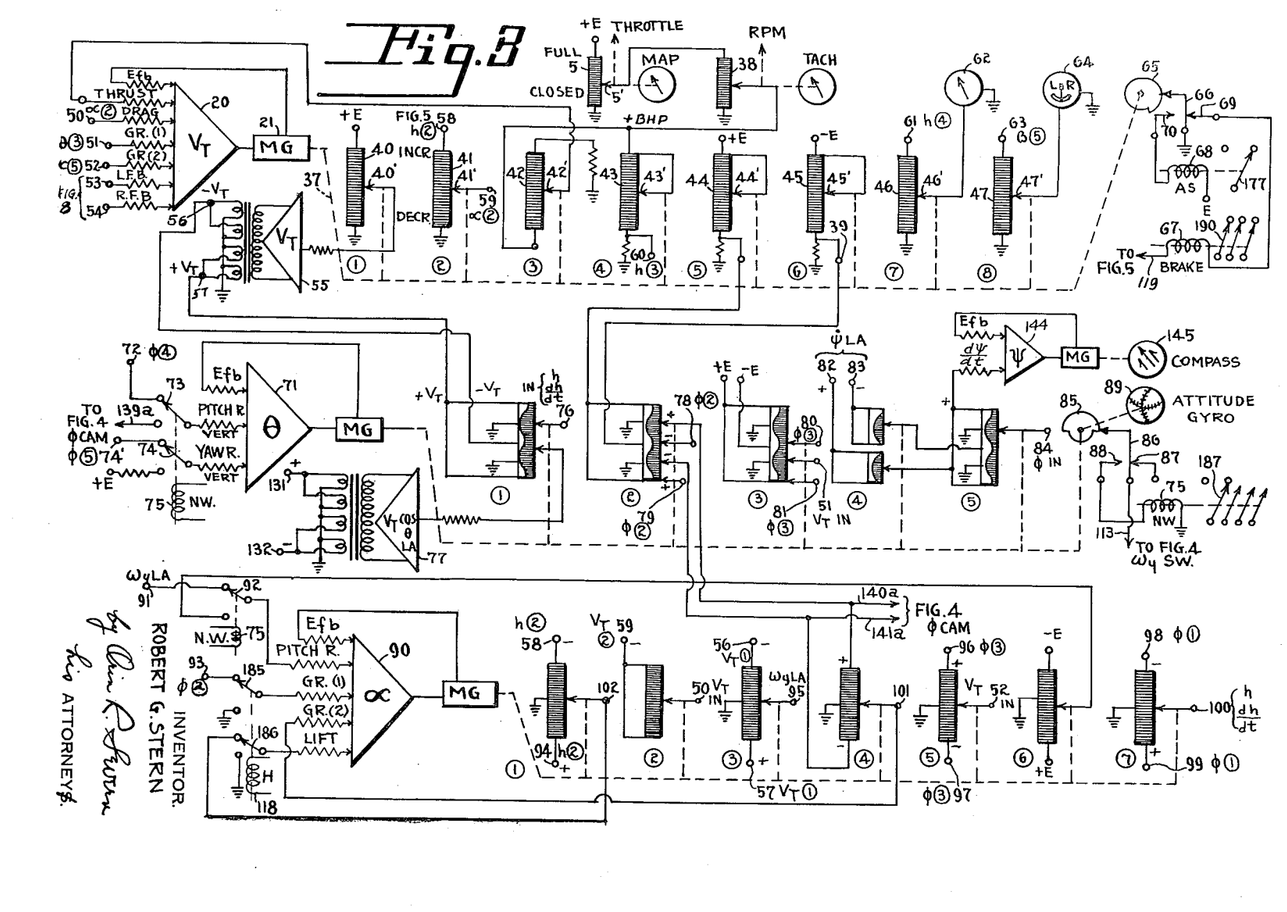
Fig. 3 is a diagrammatic illustration of the airspeed, pitch and angle of attack servo systems of the flight computing system and associated apparatus.
Figure 4:
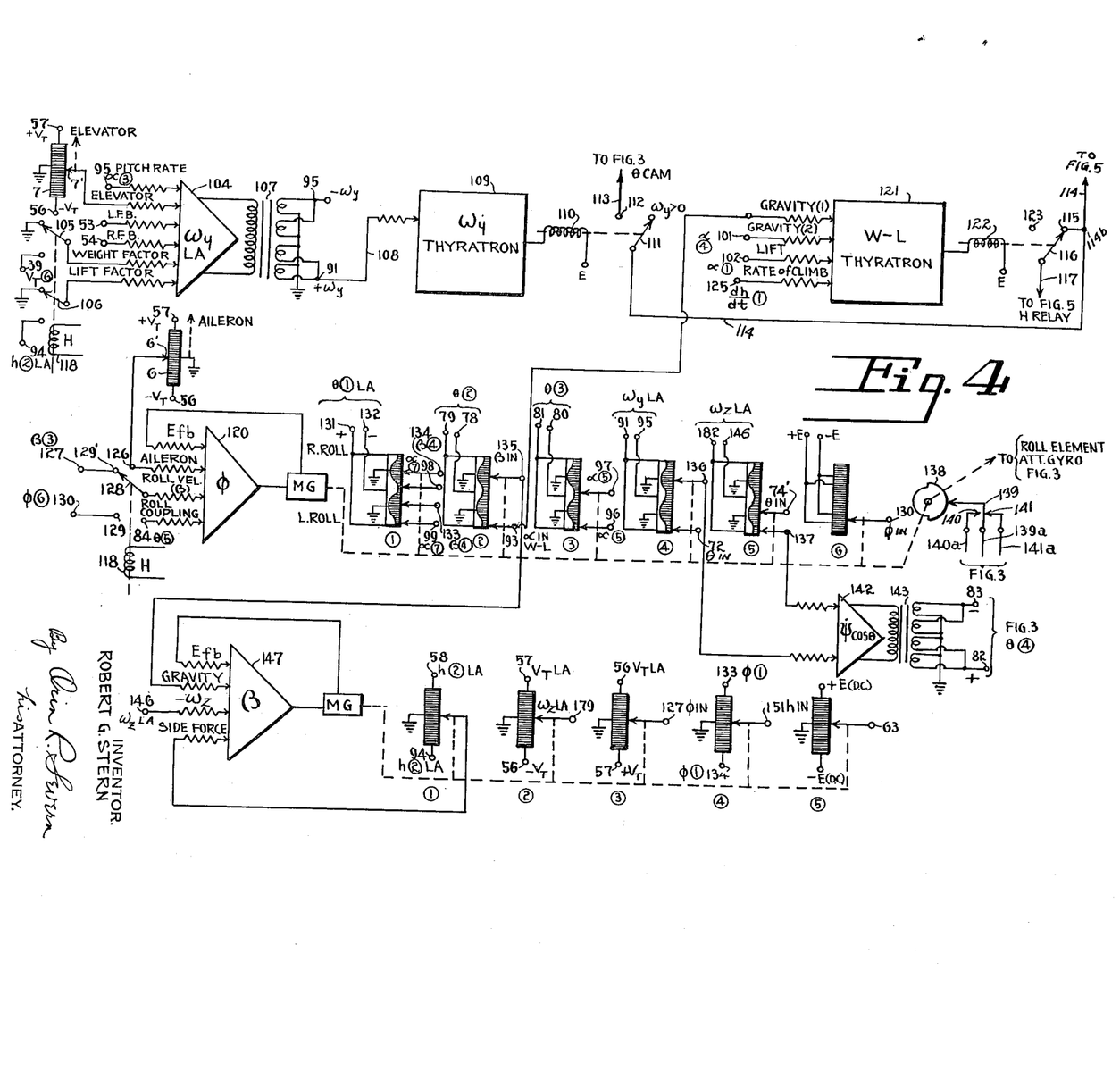
Fig. 4 is a similar illustration of the rate of pitch, roll and sideslip servo systems, together with associated apparatus of the ground sensing and flight computing system.
Figure 5:
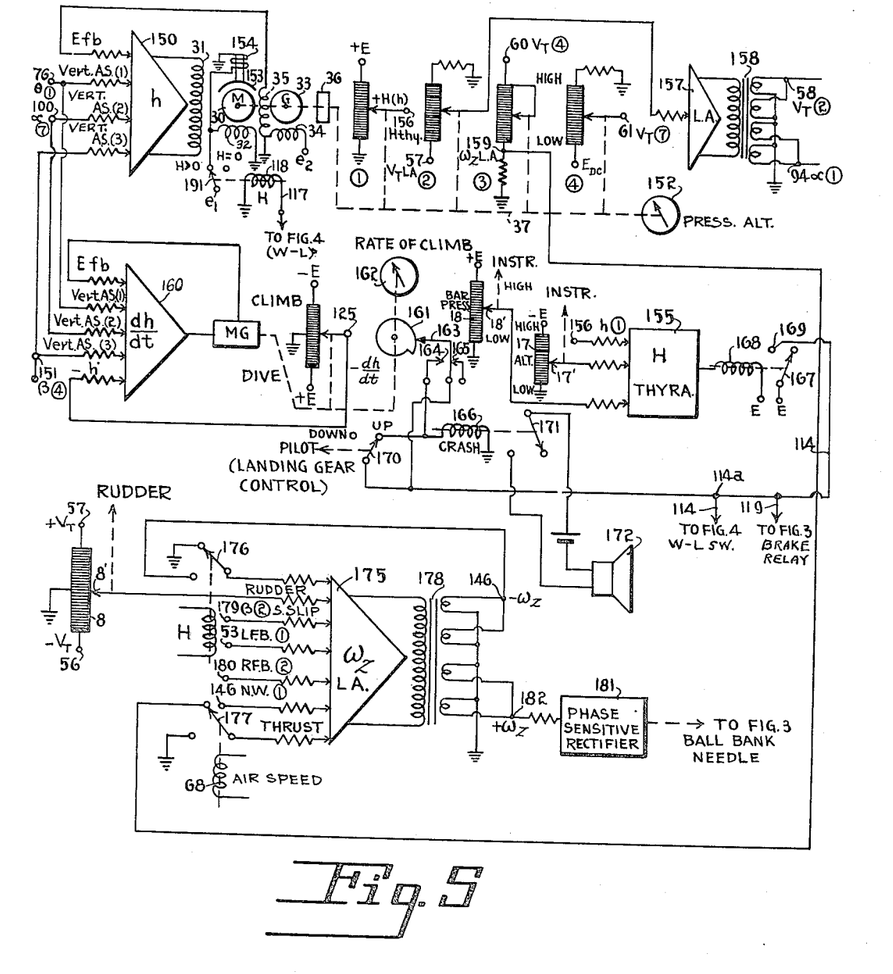
Fig. 5 is a similar illustration of the altitude, rate of climb and rate of yaw servo systems and associated equipment of the flight computing and sensing system.

The flight computing system per se illustrated in Figs. 3, 4 and 5 is not claimed herein and will be briefly described since a complete understanding of the present invention can be gained from a description of the essential functions of the various flight computer servo systems. It is therefore unnecessary for the purposes of this invention to analyze in detail the indicated servo input and output voltages representing aerodynamic control quantities other than to state that they represent velocities, forces and factors of basic flight equations.

A reference alternating current voltage source E is used for energizing the complete system and the various derived and control voltages are obtained from this source, it being understood that the positive and negative indications represent instantaneous polarity with respect to the reference source. For example, various aircraft flight control potentiometers are energized by voltages representing certain functions of airspeed (V$_T$) obtained from the computing system. The throttle potentiometer 5, Fig. 3, is energized as indicated at its upper terminal by a voltage E and is grounded at its lower terminal. The derived voltage from sliding contact 5' as the throttle is adjusted is modified according to air speed as presently described to represent thrust (T) for a constant R. P. M. according to the relationship $T=hp/v$. The aileron, elevator and rudder potentiometers 6, 7 and 8 respectively, Figs. 4 and 5, are each energized at their upper terminals by a positive voltage (+V$_T$) and at their lower terminals by a negative voltage (−V$_T$) representing the value of true air speed. Also each of these three potentiometers is provided with a grounded center tap for simulating positive and negative angular velocities about the conventional aircraft axes, Fig. 6, with respect to a normal level flight position. The various derived velocity voltages from the control potentiometers are directed to the computing system from which control voltages are obtained for operating the flight indicating instruments and ground sensing system of the trainer T above referred to.

The flight computing and integrating apparatus as shown by Figs. 3, 4 and 5 will now be described. This apparatus as shown comprises essentially seven motor servo units and two summing amplifier units, each representing a flight condition such as air speed, angle of attack, rate of pitch, etc. interconnected in an interacting electro-mechanical network so as to operate according to certain flight principles for simultaneously and continuously computing the respective flight condition. For the purpose of clarity the interrelating circuits of the servo units illustrated are simplified to an extent sufficient to teach the invention.

Figure 6:
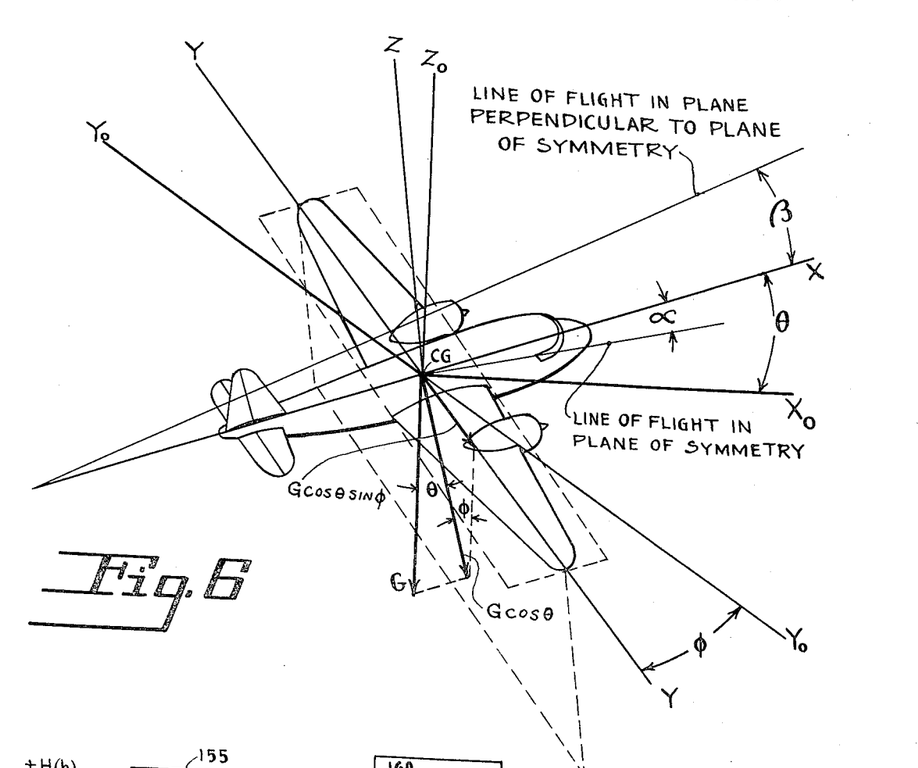
Fig. 6 is a vector diagram illustrating aircraft reference axes, flight angles and resolution of force vectors.

Primarily in the operation of the present system voltages are derived in accordance with the operation of the above described simulated aircraft controls proportional to the various velocities and forces that produce motion or acceleration with respect to three reference axes according to fundamental aerodynamic principles. The three reference axes referring to Fig. 6, are (1) the longitudinal or X axis of the aircraft, (2) an axis Y along the plane of the wings perpendicular to the longitudinal axis and (3) an axis Z mutually perpendicular to the other two, all axes intersecting the center of gravity of the aircraft.

The fixed or earthbound axes are shown as X$_0$, Y$_0$ and Z$_0$ respectively, the X$_0$ axis also representing the north reference direction in this case. As shown, the aircraft is nosed upward by a pitch angle $\theta$ and is rolled to the right by a roll angle $\phi$. The azimuth angle $\psi$, which is the angle measured in a horizontal plane between the north reference direction $X_c$ and the airplane X axis, is not shown since it is zero in the present instance. Fig. 6 also illustrates the resolution of the weight (W) or gravity vector for a combined pitch and roll attitude. Two other angles that are used in this analysis are the angle of attach $\alpha$ and the angle of sideslip $\beta$. The angle of attack is the angle, measured in the airplane's plane of symmetry (X—Z plane) between the fuselage reference line of the airplane or X axis and the flight path. The angle of sideslip is the angle measured in a plane perpendicular to the airplane's plane of symmetry (parallel to X—Y plane) between the fuselage reference line (X axis) and the flight path. These two angles are known as the aerodynamic angles. Aerodynamic forces and angular velocities are caused by the variation of either of the angles.

Translation and rotation with respect to the aircraft axes and with respect to the fixed axes mutually perpendicular and parallel to the horizon are determined by the servo systems. In one of these systems forces are computed to determine air speed, in another system, angular velocities are computed to produce rate of yaw, and in a third angular velocities are computed to produce rate of pitch. Additional servos are provided to represent angle of attack and sideslip respectively, the angle of attack servo integrating angular velocities about the Y axis for the purpose of computing aerodynamic quantities of lift, drag, and pitching velocity, and the sideslip servo computing the angle between the plane of symmetry of the aircraft and the flight path. Other servos function to integrate angular motions according to control voltages produced by servos above referred to, for representation of the flight attitude as defined by roll, pitch and azimuth angles.

According to well known principles of aerodynamics, air speed ($V_T$) is a function of engine thrust (T) which is always positive (except for propeller drag when idling in flight below about 1200 R. P. M.), gravity (G) effect which may be either positive or negative depending on whether the aircraft is in a dive or climb attitude, and drag which is of course negative. Drag may be considered as a function of the air speed ($V_T$), the altitude ($h$), and the angle of attack ($\alpha$).

Referring now to Fig. 3, it will be assumed that a plurality of A. C. voltages representing various values of thrust, gravity and drag respectively, according to the instantaneous polarity and magnitude of the respective voltages are fed separately into a summing amplifier diagrammatically indicated at 20 included in a servo system designated "air speed." Such amplifiers are well known in the art for algebraically summing a plurality of separate A. C. voltages of varying magnitude and polarity, and a detailed circuit illustration is therefore unnecessary. The output of the amplifier 20 is used to control an automatic balancing servo network including a motor-generator set 21 diagrammatically indicated as M-G. The circuit connections thereof are specifically shown in the altitude or $h$ servo of Fig. 5 and since the M-G operation is essentially the same for the other servos, a single illustration is sufficient. The motor 30 is of the two-phase type, the control phase 31 of which is energized by the amplifier output as illustrated and the other phase 32 by a constant reference A. C. voltage $+e_1$. The operation of this type of motor is well known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor drives a two-phase feed-back generator 33 also having one phase 34 energized by an A. C. reference voltage $+e_2$, the other phase 35 generating according to the motor speed a feedback voltage $E_{fb}$ for purposes of rate control hereinafter described.

The feed-back voltage $E_{fb}$ in the air speed servo system, Fig. 3, represents $$\frac{dV_T}{dt}$$

i. e., acceleration, and is an input for the amplifier 20. The motor also serves to gang-operate through a gear reduction train 36, Fig. 5, and suitable mechanical connections indicated by dotted lines 37 the contacts of a potentiometer system and also in certain servo systems an appropriate indicating instrument.

The individual potentiometer resistance elements, such as the units 40 to 47 inclusive of the airspeed servo system may be of the well-known wound card type and are of circular or band form in practice but are diagrammatically illustrated in a plane development for clearness. A structural arrangement that may be conveniently used for a servomotor and potentiometer combination of the character above referred to is shown by Patent No. 2,431,749 issued December 2, 1947, to R. B. Grant for "Potentiometer Housing and Positioning Structure."

It will therefore be apparent that operation of the air speed servomotor in either direction causes the gang-operated potentiometer slider contacts 40', 41', 42', etc. to move to corresponding angular positions on the respective potentiometer elements for deriving, i. e. selecting or picking off, potentiometer voltages dependent on the respective contact position. Each potentiometer of each servo system is shaped or contoured so that the value of the derived voltage at the potentiometer contact bears a certain relationship to the linear movement of the slider contact depending on the particular function of the potentiometer, and has a voltage impressed across its terminals depending as to instantaneous polarity and magnitude also on the function of the potentiometer. In the present case the contour of all functional potentiometers represents the derivative of the function represented. For example, the potentiometers of the air speed system are of the linear type to represent a relationship $x=y$, where $x$ represents the linear movement of the contact and $y$ represents the derived potentiometer voltage.

Stated more specifically, the contour or width variation and therefore the resistance distribution of the various potentiometers used to derive voltages simulating aircraft characteristics is proportional to the derivative of the function of the respective characteristic with respect to the variable represented by the setting of the potentiometer. For example, let it be assumed that the function is a linear one as where a derived voltage is to be directly proportional to the distance that the servo operated potentiometer contact is from a zero position. The slope of the function curve then is the constant ratio of derived voltage to increase in the independent variable represented by the contact travel from the zero position. The derivative of this relationship is the same for all contact settings so that the width of the card is uniform, making it rectangular in shape.

In another case where a cosine function is involved, the derivative or slope of the cosine curve may be expressed as $$\frac{d(\cos \theta)}{d\theta} = -\sin \theta$$

where $\theta$ is the angle measured in radians. Accordingly the contour of the potentiometer card for corresponding values of $\theta$ is sine shaped, the negative value being taken care of by corresponding selection of the polarity applied to the potentiometer. Conversely where a sine function is involved the potentiometer card for corresponding values of $\theta$ will have a cosine contour.

In view of the complexity of the interconnecting wiring of the servo systems, a simplified system will be used in order to avoid confusion and to expedite following the various circuits. Except where actual circuit connections are shown, the input and output terminals of the potentiometers, the input terminals of the respective servo and line amplifiers and associated equipment will be designated by both reference numbers and symbols indicating the corresponding terminals of other apparatus to which they are connected. For convenience the potentiometers of each servo system are designated specially, for example the third potentiometer of the airspeed servo ($V_T$) as ③, the fifth potentiometer of the angle of attack servo ($\alpha$) as ⑤, etc. so that by identifying a servo system by its symbol and a potentiometer of that system by its number, the connections between potentiometers, servo systems, etc. can be readily determined.

Referring specifically to the airspeed servo system, the servo amplifier 20 is shown as energized by a plurality of voltage inputs, the first two (starting from the top) being from the servo system itself and representing as indicated feedback $E_{fb}$ from the servo generator and thrust from $V_T$ potentiometer #3 respectively. The thrust potentiometer is energized as shown at its lower terminal by a voltage representing brake horsepower B. H. P. that is in turn derived from the throttle potentiometer 5 controlled by the student, Fig. 2. The throttle derived voltage may be modified by a R. P. M. potentiometer 38 that is also adjustable by the student to represent governor setting. An indicator MAP representing manifold pressure can be connected to the throttle control and an indicator TACH representing R. P. M. can be connected to the "governor" setting if desired. The remaining inputs to the $V_T$ amplifier are from other parts of the computing system, input terminal 50 being energized from the corresponding terminal 50 of potentiometer card #2 of the $\alpha$ servo by a voltage representing drag, terminal 51 from slider terminal 51 of card #3 of the pitch ($\theta$) servo by a voltage representing a gravity component, terminal 52 from slider terminal 52 of card #5 of the $\alpha$ servo by a second gravity component voltage, and terminals 53 and 54 by voltages representing left and right wheel brake application from potentiometers 13 and 12 respectively, Fig. 8, when the aircraft is represented as grounded. The resultant of the various voltage inputs above described operates the servomotor according to change in simulated airspeed, the motor being de-energized to represent a constant airspeed when the resultant of the various inputs during flight is zero.

The eight potentiometers of the airspeed servo are used to derive voltages according to airspeed for energizing indicating instruments, the $V_T$ line amplifier 55 and other servo systems, it being noted that cards #2, 7 and 8 are in turn energized from other parts of the system. Specifically card #1 is energized by a voltage E and the contact 40' is operated according to change in airspeed for deriving a voltage representing air speed $V_T$ which is fed to a line amplifier 55 for producing voltages at the output transformer terminals 56 and 57 representing $-V_T$ and $+V_T$. These voltages energize cosinusoidal card #1 of the $\theta$ servo, as well as other cards hereinafter described. The airspeed card #2 is energized through a line amplifier 157 and transformer 158 from card #2 of the altitude ($h$) servo, Fig. 5, by a voltage representing air density times air speed, and the derived voltage from this card energizes $\alpha$ card #2. The aforesaid altitude card #2 is in turn energized at terminal 57 from terminal 57 of the output transformer of the airspeed line amplifier 55. Cards #3 and #4 are energized from the throttle and R. P. M. potentiometers above referred to by voltage representing brake horsepower, the derived voltage from card #3 being an input to the $V_T$ servo and the derived voltage from card #4 at terminal 60 energizing the $h$ card #3. Cards #5 and 6 are energized by voltages $+E$ and $-E$ respectively for deriving voltages representing the reciprocal of true air speed for energizing $\theta$ card #2; the voltage from card #6 at terminal 39 also is an input for the $\omega_y$ system at terminal 39, Fig. 4. Card #7 is energized at terminal 61 from $h$ card #4 to derive a voltage at slider 46' representing the indicated air speed. Indicator 62 can be energized by this voltage to represent indicated air speed. The card #8 is energized at terminal 63 by a voltage from the sideslip ($\beta$) card #5, Fig. 4, for deriving a voltage representing side-slip and this voltage can be used for energizing an instrument 64 to simulate the ball indication of a ball-bank indicator.

The $V_T$ servo also positions a cam 65 for operating a switch 66 according to critical conditions of air speed for in turn controlling a brake relay 67 and an air speed $V_T$ relay 68 hereinafter described. The cam causes de-energization of the brake relay when air speed is greater than zero coincident with other conditions hereinafter described, and causes energization of the air speed relay when air speed equals zero as indicated.

Figure 7:
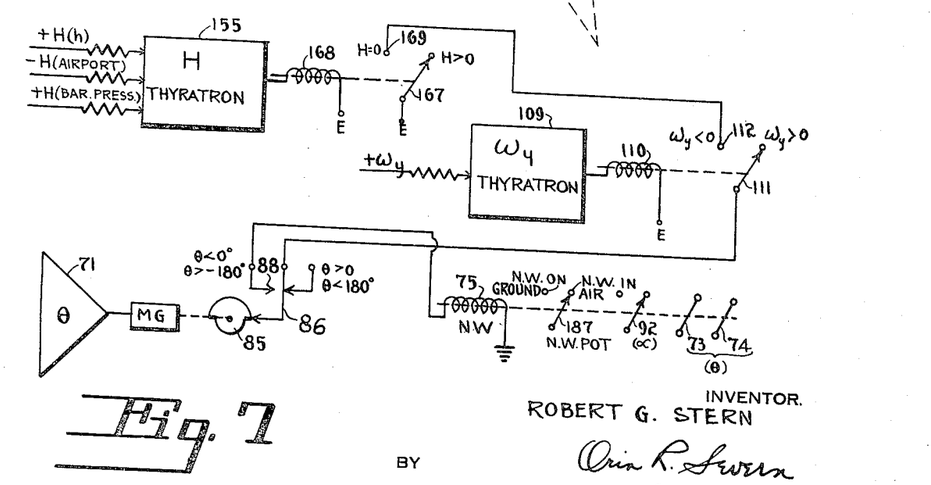
Fig. 7 is a detached illustration of runway relay operation in the ground sensing system with respect to the pitch servo.

The pitch ($\theta$) servo system includes a servo amplifier 71 and five potentiometer cards all of which, except card #4, are cosinusoidal in design. The inputs to the $\theta$ servo during simulated flight comprise feedback from the generator, a voltage at terminal 72 representing pitch rate in the vertical plane from the roll ($\phi$) card #4, Fig. 4, and a voltage at terminal 74' representing yaw rate in the vertical plane from $\psi$ card #5. These inputs are connected to the amplifier 71 through switches 73, 74 which are operated for simulated ground operation by a nose wheel relay 75 hereinafter described in connection with Fig. 7. Card #1 is energized from amplifier 55 according to $V_T$ for deriving a pair of voltages representing the resolution of $V_T$ for pitch. One of the voltages at terminal 76' is an input to both the H servo amplifier and the rate of climb-dive $$\frac{(dh)}{(dt)}$$

servo amplifier, and the other energizes a line amplifier 77 for producing at the output transformer terminals 131 and 132 positive and negative voltages representing cosinusoidal values of $V_T$. Card #2 is energized by voltages representing $$\frac{1}{V_T}$$

these voltages coming from cards #5 and 6 of the $V_T$ servo. Four voltages are derived from this card, two of which from terminals 78 and 79 energize card #2 of $\phi$ servo, the other two energizing $\alpha$ card #4 and also being selectively fed by conductors 140a and 141a to $\theta$ servo input through cam switch 139 of the $\phi$ servo. The card #3 is used for deriving a plurality of voltages according to cosinusoidal values of $\theta$, one voltage at slider terminal 51 being an input to the $V_T$ servo and the other two voltages at terminals 80 and 81 energizing $\phi$ card #3 for roll resolution. Card #4 which comprises separate sections for deriving secant functions is energized from the terminals 82 and 83 of a corresponding line amplifier output transformer 143 as shown in Fig. 4, the derived voltages therefrom in turn energizing card #5 from which the derived voltage at terminal 84 representing "roll coupling" is fed to the input terminal 84 of the $\phi$ servo amplifier 120. One of the voltages derived from card #4 is also used as an input to the $\psi$ servo amplifier, Fig. 3, for controlling the position of the simulated compass 145.

Figure 9:
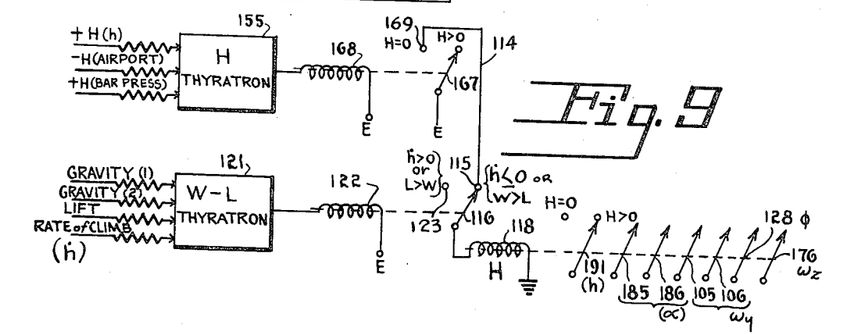
Fig. 9 is a detached illustration of the H and W-L relays used in the ground sensing system.

The $\alpha$ servo amplifier 90 is energized by a plurality of inputs, namely feed-back $E_{fb}$ from the generator, a voltage at terminal 91 during flight from the summing amplifier (S. A.) of the rate of pitch system, Fig. 4, this input being controlled by a switch 92 also controlled by the aforesaid nose wheel relay 75. Another input at terminal 93 is from card #2 of the $\phi$ servo through switch 185 of the H relay 118, the circuit of which is shown in Fig. 9, representing a gravity component, another gravity component coming from card #4 of the α servo. Finally an input voltage representing lift is obtained directly from card #1 of the α servo through switch 186 of the H relay, this card in turn being energized at terminals 58 and 94 from the line amplifier 157 energized from card #2 of the H servo, Fig. 5. It will be noted that when the H relay is energized (thereby representing ground contact), switches 185 and 186 ground the respective input circuits. This condition, coincident with operation of the nose wheel relay 75 which connects a "position" voltage from the α system to amplifier 90, causes the α servo to position itself at a predetermined angle representing three-point ground contact.

The remaining cards of the α servo namely cards #2, 3, 5 and 7 are used for deriving voltages for other parts of the flight computing system. Card #2 is energized at terminal 59 from the $V_T$ card #2 for producing a drag voltage previously referred to for the $V_T$ input. Card #3 is energized at terminals 56 and 57 according to air speed from amplifier 55 for producing at terminal 95 a voltage representing pitching rate due to angle of attack for the $\omega_y$ line amplifier (LA), Fig. 4. Card #5 is energized at terminals 96 and 97 from roll card #3, Fig. 5, for producing at terminal 52 the aforesaid gravity component voltage for the input of the $V_T$ servo, and card #7 is energized at terminals 98 and 99 from roll card #1 for producing a voltage representing a component of vertical air speed. This component voltage is an input for the $h$ servo amplifier and also for the $$\frac{dh}{dt}$$

amplifier, Fig. 5.

Referring now to Fig. 4, the $\omega_y$ line amplifier 104, the output voltage of which represents rate of pitch, is energized by a plurality of input voltages, most of which have been described above. Terminal 95 is energized by a rate of pitch voltage from the α servo and terminal 103 is connected directly to the contact 7' of the elevator potentiometer 7, from which the elevator control voltage representing pitching velocity is derived. Terminals 53 and 54 may be energized by foot brake voltages, Fig. 8, for simulated runway operation and the terminals 39 and 94, which are adapted to be connected to the amplifier through switches 105 and 106 of the H main relay, Fig. 9, hereinafter described, are energized from the air speed card #6 and altitude line amplifier 157 respectively as indicated. During simulated flight the contacts of the H relay are in the positions shown. The voltage from terminal 39 ($V_T$ card #6) represents a weight factor and the voltage from terminal 94 represents a lift factor, these terminals being connected in the input circuits only when the H relay is energized to represent runway or airfield operation, i. e. when H which represents altitude above the airfield equals zero.

The output of the $\omega_y$ line amplifier energizes a transformer 107 having a multiple secondary winding for producing voltages at terminals 95 and 91 of opposite phase, one of the voltages representing rate of pitch being directed by conductor 108 to electronic valve apparatus 109 such as a grid-controlled electric discharge device known generally as a "thyratron." As is well known in the operation of such devices, the thyratron can be made to "fire" when the input voltage on the grid is negative. When the thyratron fires, the $\omega_y$ relay 110 is energized to operate a switch 111 to engage contact 112. This represents a condition wherein $\omega_y$ is negative or less than zero. Contact 112 is in turn connected by conductor 113 to the cam switch 86, Fig. 3, for controlling the nose wheel relay 75. The $\omega_y$ relay switch 111 is connected by conductor 114 in a series circuit including the nose wheel relay 75 and θ cam switch 87, Fig. 3, and a switch 167 operated by the H thyratron 155, Fig. 5. The H thyratron switch 167 is connected at E to a voltage source so that the nose wheel relay is energized only when all three switches described are closed. The brake relay 67, Fig. 3, also is adapted to be energized from the switch 167 through branch conductor 119 that is connected to junction 114a in conductor 114, Fig. 4, and through the $V_T$ cam switch 66. The H thyratron switch also is adapted to energize the H main relay 118, through conductor junction 114b, the W-L thyratron switch 116, and conductor 117, Figs. 4 and 5.

Referring specifically to W-L switch 116, the operating means thereof comprises a thyratron or the like 121 and a relay 122 that is energized upon firing of the thyratron for operating the switch 116 to the open position 123 which represents a simulated condition wherein the aerodynamic lift (L) is greater than the aircraft weight (W), or a condition wherein rate of climb $$\frac{dh}{dt}$$

is greater than zero. In the de-energized position of the relay, the switch engages contact 115 to represent the opposite conditions respectively. As hereinafter described, the $$\frac{dh}{dt}$$

(or $\dot{h}$) input is proportionately greater than the other inputs so that for air-borne conditions, except level flight where $$\frac{dh}{dt}$$

is zero, this input predominates to control the thyratron 121. The W-L resultant input on the other hand, controls the thyratron for "on run-way" conditions.

The grid of the co-called W-L thyratron 121 is energized by the resultant of the input voltages, three of which have been referred to. Two voltages representing gravity or weight components constitute inputs at "gravity (1)" and "gravity (2)" at terminal 101, and terminal 102 is energized by a lift voltage, all from the respective servo systems indicated. Terminal 125 is energized from the vertical air speed card #1, Fig. 5, by a voltage representing rate of descent $$\frac{(-dh)}{(dt)}$$

When the resultant voltage on the thyratron grid is negative, the thyratron fires to energize relay 122. The operation of the W-L relay will be more fully described in connection with the ground sensing system since it does not by itself affect the flight computing system during simulated flight, i. e. when the aircraft is "airborne."

The roll (φ) servo system operates the roll element of the attitude gyro 89, Fig. 3, and is used for resolving various control voltages according to roll attitude. The inputs for the φ servo amplifier 120 include a feed-back voltage from the generator, a voltage at terminal 126 directly from contact 6' of the aileron potentiometer 6 representing roll velocity, a voltage at terminal 127 from β card #3 representing roll velocity due to side slip, and a voltage representing the above-mentioned roll coupling at terminal 84. The terminal 127 is connected to the servo amplifier through a switch 128 controlled by the H main relay 118. When runway contact is represented, the relay is energized to operate switch 128 to contact 129 which is adapted to be energized by a position voltage from φ card #6 for limiting the roll attitude of the aircraft on the ground.

The φ potentiometers, all except linear card #6 being cosinusoidal, are energized for deriving voltages as follows: card #1 is energized at terminals 131 and 132 from the line amplifier 77 connected to θ card #1, Fig. 3, for deriving four voltages, two of which at terminals 98 and 99 energize α card #7, and the other two at terminals 133 and 134 energize β card #4; card #2 is energized at terminals 78 and 79 from θ card #2 and two voltages are derived therefrom, the first at terminal 135 being an input for β servo amplifier and the second at terminal 93 being an input for both the α servo amplifier and the W-L thyratron; card #3 is energized as previously stated at terminals 80 and 81 from θ card #3 and energizes α card #5 from terminals 96 and 97; card #4 is energized at terminals 91 and 95 according to rate of pitch as indicated for deriving two voltages, one of which is an input for the $$\frac{d\Psi}{dt} \cos \theta$$

line amplifier 142, Fig. 4, and the other at terminal 72 an input for the θ servo amplifier; card #5 is energized at terminals 182 and 146 according to rate of yaw from the $\omega_z$ line amplifier for deriving an input voltage at terminal 74' for the θ amplifier and an input voltage for the aforesaid $$\frac{d\Psi}{dt} \cos \theta$$

amplifier; linear card #6 is energized for obtaining at terminal 130 a position voltage according to roll and the cam 138 is likewise so positioned for operating a roll switch 139 for engaging contacts 140 and 141 of the sensing system. For convenience the term $$\frac{d\Psi}{dt}$$

is indicated on the drawings by the mathematical symbol Ψ.

The function of the roll switch 139 is to control the polarity of an input voltage for the θ servo for automatically positioning said servo at three-point runway attitude when the θ controlled nose wheel relay 75 is energized through the ground sensing system. This voltage which is connected by conductor 139a to the θ input by the relay switch 73, is selected by the cam switch 139 from a pair of opposite voltages at contacts 140 and 141 derived from θ card #2 and causes the θ servo to take a three-point ground attitude regardless of the roll and pitch attitudes at the time of "landing." In other words, the system will automatically "right" itself if the student makes a poor landing so as to be in readiness for another "take-off."

It will be noted that the variation in the various angular rates and forces such as gravity, lift, centrifugal force, thrust, drag, pitching velocity and the like are accomplished by the change in contact brush position on the respective potentiometers together with variation in the potentiometer energizing voltage, whereas the relative magnitude or effect of each of the aforesaid rates, forces and moments is determined by the value of the input resistance to the various amplifiers. As a specific example, the relative magnitude of lift is affected by the values of air density (ρ), angle of attack (α) and a constant factor proportional to wing area. These terms determine the resistance value of the lift input indicated at the α amplifier 90, Fig. 3. Lowering the value of the resistance increases the relative magnitude of the above constant.

The use of the feed-back generators for rate control is particularly important, the pitch servo integrating system serving as an example. If the servo motor alone were relied upon to perform the pitch integrating operation the natural inertia of the driving mechanism would introduce such a large error that from a practical standpoint the system would not be useful. However, with the feed-back generator connected in the system, the generated feed-back voltage $E_{f0}$ constitutes an input for the pitch amplifier and is of such phase relation to the summed or resultant input signal that it opposes the same, i. e. in the manner of degenerative or negative feed-back. With large gain in the control amplifier the speed of the motor according to well known principles is therefore caused to have a linear speed response to the magnitude of the input signal, i. e. rate of pitch voltage, without lag or overshooting, thereby integrating both high and low rates of pitch with equal precision. It will be apparent that when the main input signal is reversed so as to operate the motor and generator in the opposite direction, the phase of the generated feed-back voltage is likewise reversed to oppose the input signal as before.

The rate of azimuth change $$\frac{(d\Psi)}{(dt)}$$

is determined by resolving rate of pitch ($\omega_y$) and rate of yaw ($\omega_z$) for roll ($\phi$) and pitch ($\theta$). For this purpose line amplifier 142, Fig. 4, is energized from θ cards #4 and #5 above referred to and produces by means of transformer 143 a pair of oppositely phased control voltages. The amplifier input voltage derived from φ card #4 represents yaw rate resolved into a plane that is inclined to the vertical by an angle θ, and the input voltage derived from φ card #5 represents pitch rate resolved into the same plane. The voltages obtained at the output of this line amplifier at terminals 82 and 83 then represent the function $$\frac{d\Psi}{dt} \cos \theta$$

These $$\frac{d\Psi}{dt} \cos \theta$$

control voltages, as previously indicated, energize card #4 of the pitch system which in turn produces derived voltages representing rate of azimuth change $$\frac{d\Psi}{dt}$$

Accordingly, the Ψ servo amplifier 144, Fig. 3, is energized by one of the $$\frac{d\Psi}{dt}$$

voltages for positioning the indicator 145 representing a compass.

The side-slip (β) servo system comprises a servo amplifier 147 having the following input voltages: a feed-back voltage from the generator, a voltage from φ card #2 representing a gravity component, a yaw rate voltage at terminal 146 from the $\omega_z$ line amplifier and a voltage from the β card #1 representing a side force. Card #1 is energized at terminal 58 by a voltage from the line amplifier 157 connected to card #2 of the h servo for deriving the aforesaid side force voltage. Card #2 is energized at terminal 57 from the $V_T$ line amplifier according to air speed for deriving at terminal 179 an input voltage representing yawing velocity due to slideslip for the $\omega_z$ line amplifier; card #3 is energized by an oppositely phased voltage from the $V_T$ line amplifier for deriving at terminal 127 an input voltage representing roll velocity for the φ servo amplifier; card #4 is energized at terminal 133 from φ card #1 for deriving at terminal 151 an input voltage representing a component of vertical air speed for the altitude servo amplifier and the vertical air speed or rate of climb $$\frac{dh}{dt}$$

servo amplifier, Fig. 5; and card #5 is energized by a constant D. C. voltage for deriving at terminal 63 a voltage representing sideslip for energizing $V_T$ card #8, the derived voltage from which energizes the indicator representing the "ball" of the simulated combined turn and ballbank indicator 64, Fig. 3.

Referring to Fig. 5, the altitude (h) servo amplifier 150 is shown as having the following voltage inputs: a feed-back voltage from the generator 33 and three other voltages representing components of vertical air speed, namely a voltage at terminal 76 from θ card #1, a second voltage at terminal 100 from α card #7 and a third voltage at terminal 151 from β card #4. The output of the servo amplifier controls the motor 30 in the manner previously described to operate both the potentiometer contacts and an indicator 152 representing a pressure altimeter. In the present instance the servo motor 30 is provided with a non-coasting brake 153 that is automatically retracted by a solenoid 154 when the motor is energized. Thus, coasting of the $h$ motor after it has been de-energized causing the altimeter 152 to show negative altitude at ground level is precluded. The motor 30 is controlled by the H relay 118 which interrupts the circuit of motor winding 32 when the relay is energized at runway level thus de-energizing and stopping the $h$ servo. The potentiometers of the $h$ servo system function as follows: card #1 is energized by a constant voltage E and the derived voltage at terminal 156 which represents altitude above sea level is an input for the H thyratron 155; card #2 is energized at terminal 57 according to air speed from $V_T$ card #1 to the $V_T$ line amplifier for deriving a voltage representing the effect of altitude on indicated airspeed. This voltage is transformed by the line amplifier 157 and transformer 158 into a pair of oppositely phased control voltages that are used as inputs as previously described for cards of the $V_T$ and α systems; card #3 is energized at terminal 60 from the $V_T$ system by a thrust voltage for deriving an input voltage for the $\omega_z$ line amplifier which gives the effect of engine thrust on yaw rate; and card #4 is energized by a constant D. C. voltage for deriving at terminal 61 an input voltage for $V_T$ card #7, Fig. 3, which in turn energizes a D. C. indicator 62 representing an air speed meter. Thus the air speed reading is corrected for variation in altitude.

The rate of climb-dive $$\frac{(dh)}{(dt)}$$

or vertical airspeed servo system comprises a servo amplifier 160 for controlling a potentiometer according to vertical air speed and for positioning a cam 161 and an indicator 162 representing a rate of climb or vertical air speed indicator. The inputs for the amplifier 160 include a feedback voltage from the generator, three voltages above described representing components of vertical air speed and an answer voltage representing vertical air speed from the card #1 that is energized by a constant voltage E. The three voltages representing components of vertical air speed are derived respectively from θ card #1, from α card #7 and from β card #4 and are fed to the rate of climb amplifier as shown by circuits connected in parallel with the corresponding input circuits for the altimeter system. The rate of climb voltage from card #1 also is an input as previously noted for the W-L thyratron 121, Fig. 4.

It will therefore be seen that the parallel connected inputs for the rate of climb and altimeter servo systems enable these systems to be energized simultaneously and adjusted independently of each other so that the characteristic response of the rate of climb indicator and altimeter respectively of aircraft can be properly simulated. This is a significant feature in the simulation of the vertical system since in practice the rate of climb indicator has a characteristic response involving an appreciable time lag whereas the altimeter responds more promptly to change in vertical air speed.

The $$\frac{dh}{dt}$$

servo cam 161 controls a switch 163 that is positioned according to critical vertical air speed for giving a simulated "crash" alarm. When the vertical air speed on descent is for example greater than 500 feet per minute, the cam is positioned for closing the contact 164, thus controlling circuits for simulating a "crash landing." A so-called crash relay 166 is arranged to be controlled jointly by the cam switch 163 and the H thyratron switch 167. This switch is operated by a relay 168 in turn adapted to be energized by the H thyratron 155. The switch 167 is operated by its relay when the H thyratron is fired to represent ground level altitude thereby causing closing of the crash circuit at contact 169 and energization of the crash relay 166 in the event that the vertical air speed at the time of "landing" is excessive. Further realism can be introduced by connecting a pilot operated switch 170 in shunt with the cam operated switch 163 for representing the position of the landing gear. The switch 170 as shown represents "landing gear up," so that if the pilot attempts to land without "lowering" the landing gear, the crash relay 166 will be energized. Any suitable crash warning or simulation can be provided; for example, the crash relay switch 171 can close an energizing circuit for a Klaxon or the like 172; or flash bulbs can be ignited.

The H thyratron 155 is controlled so that the H relay 118 is energized according to corrected altitude of the airfield. To this end, the instructor adjusts the control potentiometers 17 and 18 for deriving voltages for representing respectively assumed altitude of the airfield above sea level and the barometric pressure at the airfield. The respective derived voltages are used as inputs for the H thyratron, together with an altitude voltage at terminal 156 from the $h$ servo card #1. When the resultant of these voltages is negative at the control grid, corrected runway altitude is indicated and the H thyratron fires causing energization of the H thyratron relay 168.

The rate of yaw ($\omega_z$) line amplifier 175 is for producing a pair of oppositely phased voltages according to yaw rate. The amplifier inputs include a feedback voltage that is connected in circuit by the switch 176 only when the H main relay 118 is energized for representing runway operation, a rudder control or turning rate voltage that is derived from the contact 8' of the pilot operated rudder potentiometer 8, a side-slip voltage at terminal 179 from β card #2, a pair of brake card voltages at terminals 53 and 180 and a nose wheel voltage at terminal 146 for runway operation, and finally a thrust voltage from $h$ card #3. The thrust voltage is cut out by the switch 177 of the airspeed relay 68 when that relay is operated to represent zero air speed.

The amplified resultant output of the $\omega_z$ line amplifier energizes a transformer 178, the secondary of which produces at terminals 146 and 182 oppositely phased voltages $-\omega_z$ and $+\omega_z$, the first of which is used for feedback and for other parts of the system as indicated. The second voltage energizes a phase sensitive rectifier 181 for operating the turn needle of the simulated ball bank indicator 64, Fig. 3. As previously explained, the ball of this indicator is operated from the $V_T$ system by a voltage representing components of side-slip and air speed.

The essential elements of a simulated flight computing system are described above and a detailed description of the operation thereof for various aerobatic maneuvers such as banking, rolls, loops, etc. is unnecessary for an understanding of the present invention. It is sufficient to state that changes in the primary input voltages from the pilot controlled throttle, aileron, elevator and rudder potentiometers affect the balance of the air speed, roll, rate of pitch and rate of yaw systems respectively, which in turn react with other servo systems, such as the angle of attack, pitch, altitude and side-slip for causing said systems to move or operate towards new positions of balance to simulate actual flight. For example, a simulated increase in air speed due to increased brake horsepower as represented by a more positive voltage at the $V_T$ input from the throttle potentiometer 5 causes the air speed servo to seek a new position of balance toward higher speed indication with the result that the potentiometer contacts of the $V_T$ system all move upward. In the case of card #1, the $V_T$ voltage is increased and since this voltage is used to energize card #1 of the $\theta$ system, the derived voltage from this card, which is an input for both the altitude and rate of climb servos is increased accordingly so that where $\theta$ is greater or less than zero, corresponding changes in altitude and vertical speed are indicated. The derived voltage from card #2 affects card #2 of the angle of attack servo so that the drag voltage tends to increase due to the increased air speed. The thrust voltages from cards #3 and #4 have been previously considered, the first of which tends to increase air speed due to increased brake horsepower and the second, which is modified by the $h$ servo, to affect rate of yaw. The voltages from cards #5 and #6 which represent gravity factors are modified by $\theta$ card #2 and also in part by $\alpha$ card #4 for producing a gravity input for the angle of attack servo. Other derived voltages from $\theta$ card #2 are modified by the roll card #2 for representing additional gravity components for the $\beta$ and $\alpha$ servos and also the W-L thyratron. The function of cards #7 and #8 has been previously described for operating simulated flight indicating instruments. The $V_T$ servo system reaches its new position of balance when the increased "drag" voltage from the $\alpha$ servo, and also the changed gravity component voltages counterbalance the increased thrust voltage, thereby de-energizing the $V_T$ servo at the new air speed.

Figure 8:
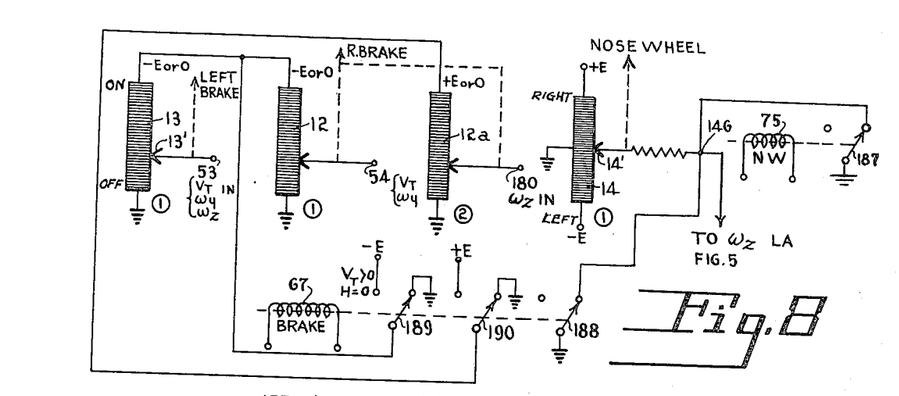
Fig. 8 is a detached illustration of the wheel brake and nose wheel control system for simulated runway conditions.

Figs. 7, 8 and 9 illustrate in detached views the essential relays and control potentiometers used primarily for simulation of runway operation and take-off and landing maneuvers. This apparatus has been generally illustrated and described in connection with the various servo systems in Figs. 3, 4 and 5. The complete function of the apparatus of Figs. 7–9 will be explained in connection with the "ground sensing" system.

Operation of the ground sensing system

The basic elements of the ground sensing system include the W-L thyratron 121 and the H thyratron 155 which controls the H main relay 118. The H main relay in turn controls either directly or indirectly the various elements of the computing system, Figs. 3–5. Referring first to Fig. 9, the inputs to the W-L thyratron are proportioned so that a relatively small variation in rate of climb or vertical air speed $$\frac{dh}{dt}$$

produces an effect at the thyratron grid equivalent to the effect produced by a large variation in W-L. When the airplane is represented as at a standstill on the runway, the H thyratron is energized since the resultant input voltage is negative but the W-L thyratron is not energized since the W-L inputs, except for $$\frac{dh}{dt}$$

which is zero, are predominantly positive. On simulated take-off, $V_T$ increases as the airplane gathers speed in going down the runway, the W-L voltages become progressively less positive and the $$\frac{dh}{dat}$$

voltage remains zero. As $V_T$ increases, the lift voltage from $\alpha$ card #1 increases due to the fact that the $\alpha$ servo is positioned at a positive angle for runway operation. Finally, $V_T$ becomes sufficiently high for the lift to exceed the drag, and the W-L inputs produce a resultant negative voltage so that the W-L thyratron is energized and the H main relay is de-energized.

When the H main relay is de-energized, the $\alpha$ system begins to function as shown by Fig. 3. In the energized condition, the H relay, by means of switches 185 and 186, causes the $\alpha$ amplifier input to be grounded. It should be noted that in the de-energized position, the $\alpha$ servo is set at a predetermined positive angle of attack to represent the three-point position of the aircraft on the runway so that $\alpha$ card #1 is still effective to derive a "lift" voltage according to the indicated airspeed as represented by $V_T$ modified by $h$ card #2. This positive angle of attack is determined by $\alpha$ card #6 which derives a position voltage. With the $\alpha$ system now normally functioning, a positive rate of climb is indicated and the altitude servo also begins to function and to indicate increasing altitude. As soon as the altitude increases, the resultant input for the H thyratron becomes positive so that the H thyratron is de-energized. The take-off sequence is now complete since all servos affected by the H main relay, namely $\alpha$ system of Fig. 3, the $\phi$ and $\omega_y$ systems of Fig. 4 and the H and $\omega_z$ systems of Fig. 5, are now interconnected for normal flight computation. As previously explained, the H relay controls directly the m-g set of the $h$ servo rather than the amplifier inputs.

As long as the aircraft is represented as airborne, the H thyratron is de-energized. While the aircraft is airborne, the operation of the W-L thyratron will depend primarily on the value $$\frac{dh}{dt}$$

and only to a small extent on W-L because of the relative values of the respective input resistors. Thus in flight the W-L thyratron is energized when $$\frac{dh}{dt}$$

is positive and is de-energized when $$\frac{dh}{dt}$$

is negative. However, the H thyratron remains de-energized and accordingly the H main relay is de-energized as long as the aircraft is airborne.

When the aircraft is represented as coming in for a landing, the W-L relay is de-energized because the aircraft is losing altitude and thus $$\frac{dh}{dt}$$

is negative. When the aircraft finally touches the runway, the H thyratron relay is then energized as above explained, and the H main relay is then energized, Fig. 9. The motor of the $h$ servo is then stopped immediately by its brake 153, Fig. 5, and the $$\frac{dh}{dt}$$

servo returns to its zero position. The W-L relay remains energized however because W is now greater than L and thus the resultant voltage input to the W-L thyratron is positive even though $$\frac{dh}{dt}$$

is zero.

The necessity for the $$\frac{dh}{dt}$$

input for the W-L thyratron will be apparent from the following example; if in a landing maneuver, the pilot "flares" the aircraft before touching the runway, the factor W-L remains negative even though the aircraft is losing altitude. That is to say, lift exceeds weight during a flared landing since acceleration is actually positive, i. e. in upward direction. Therefore if the now positive $$\frac{dh}{dt}$$

voltage input were omitted, the W-L thyratron would be energized for a flared landing so that the H main relay would be de-energized at the time the H thyratron was energized. Accordingly, the altimeter which is controlled by the H main relay would continue operation with the result that the pilot would appear to "fly" the aircraft below the ground.

It is important to note that the operation of the W-L thyratron is determined by W-L voltages when the aircraft is on the runway and by the $$\frac{dh}{dt}$$

voltage when the airplane is airborne. This dual function of the thyratron is required if the system is to work properly for landings as well as take-offs. During the take-off, the H thyratron cannot be de-energized until the H main relay is de-energized, and the H main relay cannot be de-energized until the W-L thyratron relay is energized. Thus the take-off sequence is "triggered" by the W-L thyratron. In the landing operation the W-L thyratron is de-energized because $$\frac{dh}{dt}$$

is negative, thereby causing the relay swtich 116 to be closed. The H main relay becomes energized as soon as the H thyratron is energized. Therefore, in this case the H thyratron triggers the landing sequence.

Figs. 7 and 8 illustrate how simulated nose wheel and braking operations can be performed when the aircraft is on the runway. As shown by Fig. 7, the nose wheel or $\theta$ controlled relay 75, which affects the $\theta$ and $\alpha$ servo systems, Fig. 3, is energized through the $\theta$ cam switch 86, $\omega_y$ thyratron switch 111 and the H thyratron switch 167. In other words, the conditions of (1) zero or runway altitude, (2) rate of pitch less than zero, and (3) a predetermined pitch attitude representing a three-point landing position of the aircraft must obtain before the nose wheel relay can be energized. In connection with condition (2), it should be noted that a limited "nosing down" or negative rate of pitch may also accompany deceleration of the aircraft due to braking until the nose wheel touches the ground.

Referring now to Fig. 8, it will be noted that when the nose wheel relay is energized, ground potential is removed by switch 187 from the nose wheel potentiometer 14 so that operation of the nose wheel potentiometer by the pilot now produces an input voltage at terminal 146 for the $\omega_z$ line amplifier. As previously explained, the $\omega_z$ voltages from transformer 178, Fig. 5, are modified according to roll and pitch, together with $\omega_y$ components for eventually controlling the compass indicator 145, Fig. 3. Thus a turning movement of the aircraft on the ground can be simulated by nose wheel operation if $V_T$ is greater than zero. It will be understood of course that a steerable tail wheel can be simulated as well, and that such means are intended to be covered by the term "nose wheel."

The brake relay is shown by Figs. 3 and 5 as being energized through the $V_T$ cam switch 66 and the H thyratron relay switch 167. In other words, the brake relay is energized only at runway altitude and when $V_T$ is greater than zero. When the brake relay is energized, switch 188 removes ground potential from the nose wheel potentiometer 14, switch 189 removes ground potential from the left brake and right brake potentiometers 12 and 13, and switch 190 removes ground potential from the #2 right brake potentiometer 12a. At the same time, switches 189 and 190 supply potential —E and +E respectively to the brake potentiometers as indicated. Accordingly, the pilot by operating the simulated left and right wheel brakes (LWB and RWB) supplies control potential to various servos as indicated for simulating brake action. For example, the left brake potentiometer and the right brake potentiometer #1 which are energized by potentials of the same polarity both supply retarding potentials to the $V_T$ servo for decreasing airspeed upon application of brakes. Also each potentiometer supplies voltage to the $\omega_y$ system for simulating slight nosing down of the aircraft when brakes are applied to cause the nose wheel to touch ground. In addition, the left brake potentiometer and the right brake potentiometer #2 supply voltages for the $\omega_z$ system for simulating turning control when but one brake is applied. It will be noted that the right brake control uses a pair of potentiometers 12 and 12a instead of a single potentiometer. This is because right brake potentiometer #2 must be energized by a voltage that is opposite in polarity to that of the left brake potentiometer in order to produce opposing control voltages for right and left turn. Accordingly, when uniform braking is applied LWB card #1 and RWB card #1 jointly control the $V_T$ and $\omega_y$ systems for decelerating the aircraft without turning and lowering the nose as above described. When non-uniform braking is used for runway turning control, LWB card #1 and RWB card #2 jointly control the $\omega_z$ and associated systems for indicating both rate of turn on the turn indicator 64, and compass bearing on compass 145, Fig. 3. When the brakes are "set" and the aircraft is at a standstill on the runway, the $V_T$ servo cannot be operated since the negative brake potentials are maximum and override the positive thrust voltage. Thus the $V_T$ servo is held at its zero position.

Summarizing the ground operation of the H main relay, when it is energized for runway operation the $\alpha$ servo system through ground switches 185 and 186 is de-energized except for a $\omega_y$ input, the latter being cut off by switch 92 of the nose wheel relay 75 when the nose wheel "touches" the runway. The $\alpha$ servo is then automatically positioned at three-point runway attitude by the answer voltage from card #6. For runway operation, the values of $\theta$ and $\alpha$ are small so that the resulting very small voltage from card #4 can be ignored. The $\omega_y$ system, through switches 105 and 106 is now influenced by a pair of lift and weight voltages, the combined effect of which represents a negative pitching moment caused by a reaction force between the ground and main wheels about the center of gravity. This tends to lower the nose to make nose wheel contact. The $\phi$ system is simply switched to a position voltage at contacts 128 and 129 for representing zero roll. It will be noted that the aileron card is still connected in the system so that on take-off the wings can be "dipped" slightly by aileron operation when $V_T$ is of sufficient value. The $\omega_z$ system is made more sluggish for runway turning control by switching (switch 176) negative feed-back voltage to the amplifier input, and the $h$ system is directly de-energized and stopped by the combined action of the H relay and motor brake 153. Thus all essential servo systems are properly connected for runway simulation by the H main relay.

The other ground sensing relays have been in general previously described. The $\theta$ or nose wheel relay 75 which is energized when pitch is less than or equal to zero degrees, coincident with energization of the $\omega_y$ and H thyratron relays, Fig. 7, controls inputs of the $\theta$ and $\alpha$ systems, Fig. 3, so as to limit negative pitch to the three-point runway position. However, it will be noted that an increase in the positive values of $\theta$ and $\alpha$ is permitted for take-off purposes. On landing, the $\theta$ switch 86 triggers the energization of the nose wheel relay, since this relay cannot be energized as long as the nose is "high," even though the main wheels be on the runway and pitch rate negative. However on take-off, the $\omega_y$ relay switch 111 initiates lifting of the nose wheel from the runway since a combination of air speed and elevator control produces a positive value of $\omega_y$ which de-energizes the $\omega_y$ thyratron relay 110. The switch 111 then opens causing de-energization of the nose wheel relay, thereby allowing the $\theta$ and $\alpha$ servo system to indicate increased pitch.

The $V_T$ relay, as previously noted is energized when $V_T$ equals zero for operating switch 177 at the $\omega_z$ input for cutting off the thrust voltage, so that at least some airspeed is required for turning maneuvers.

The term "relay" as used in this specification is intended to comprehend any type of apparatus having a relay function including both mechanical and electronic type relays.

It should be understood that this invention is not limited to specific details of construction and arrangement thereof herein illustrated, and that changes and modifications may occur to one skilled in the art without departing from the spirit of the invention.

What is claimed is:

1. In grounded aircraft training apparatus having flight computing means responsive to operation of simulated aircraft controls by a student pilot, said computing means including inter-acting systems for representing by control quantities simulated flight conditions including airspeed, pitch, rate-of-pitch, rate-of-climb and altitude respectively, a plurality of simulated flight indicating instruments responsive to respective systems of said computing means, and a plurality of relays responsive to said computing means, one of said relays being controlled by said computing means jointly by control quantities representing respectively a lift manifestation of simulated airspeed, altitude and rate-of-climb and another of said relays being controlled by said computing system jointly by control quantities representing simulated pitch, rate-of-pitch and altitude, said relays adapted to control inter-acting systems of said computing means so as to modify the operation of said flight instruments to simulate take-off and landing of the aircraft including nose-wheel contact.

2. In grounded aircraft training apparatus having flight computing means responsive to operation of simulated aircraft controls by a student for representing simulated flight conditions including airspeed and altitude, a plurality of simulated flight indicating instruments responsive to said computing means including a compass and rate of turn indicator, means for simulating separately operable right and left wheel brakes of the aircraft, and means controlled by said computing means and operable according to manifestations of simulated airspeed and altitude for establishing an operative connection between said simulated brakes and said compass and turn indicator to simulate non-uniform brake operation of the aircraft on a runway.

3. In grounded aircraft training apparatus having flight computing means responsive to operation of simulated aircraft controls by a student for representing simulated flight conditions including airspeed and altitude, a plurality of simulated flight indicating instruments responsive to said computing means including a compass and rate of turn indicator, means for simulating a steerable nose wheel of the aircraft, and means controlled by said computing means and operable according to manifestations of simulated airspeed and altitude for establishing an operative connection between said simulated nose wheel and said compass and turn indicator for simulating nosewheel operation of the aircraft on a runway.

4. In grounded aircraft training apparatus having flight computing means responsive to operation of simulated aircraft controls by a student for representing simulated flight conditions including airspeed and altitude, a plurality of simulated flight indicating instruments responsive to said computing means including a compass, a pitch indicator and an airspeed meter, means for simulating separately operable right and left wheel brakes of the aircraft, and ground sensing means controlled by said computing means and operable according to manifestations of simulated airspeed and altitude for representing a grounded condition of the aircraft and establishing an operative connection between said simulated brakes and said pitch indicator whereby forward pitching moment produced by wheel braking may be simulated, said ground sensing means also adapted to establish an operative connection between said simulated brakes and said compass to simulate steering of the aircraft by non-uniform operation of wheel brakes on a runway, said ground sensing means also adapted to establish an operative connection between said simulated brakes and said airspeed meter to simulate control of aircraft speed on the ground.

5. In grounded aircraft training apparatus having flight computing means responsive to operation of simulated aircraft controls by a student for representing simulated flight conditions including airspeed and altitude, a plurality of simulated flight indicating instruments responsive to said computing means including an airspeed meter and altimeter, ground sensing means controlled by said computing means and operable according to manifestations of simulated airspeed and altitude to represent a grounded condition of the aircraft, means for simulating wheel brakes operable when set to prevent operation of said airspeed meter in said grounded condition and to clear the operation of said airspeed meter upon release of said brakes, said ground sensing means including means responsive to said computing means according to a lift manifestation of airspeed for causing said altimeter to indicate increasing altitude in simulated takeoff.

6. In grounded aircraft training apparatus having flight computing means responsive to operation of simulated aircraft controls by a student for representing simulated flight conditions including airspeed and altitude, a plurality of simulated flight indicating instruments responsive to said computing means including an airspeed meter, pitch indicator and an altimeter, ground sensing means controlled by said computing means and operable according to manifestations of simulated airspeed and altitude to represent a grounded condition of the aircraft, said computing means being operable normally to simulate airborne conditions prior to simulated landing represented by ground altitude, means for limiting said pitch indicator to three-point ground position in accordance with decrease in simulated airspeed to simulate lowering of the nose wheel to the runway, means for simulating wheel brakes and means operable in accordance with said three-point ground representation for establishing an operative connection between said simulated brakes and airspeed meter for simulating deceleration of the aircraft on the runway.

7. In grounded aircraft training apparatus having flight computing means responsive to operation of simulated aircraft controls by a student for representing simulated flight conditions including airspeed and altitude, a plurality of simulated flight indicating instruments responsive to said computing means including an airspeed meter, pitch indicator and an altimeter, ground sensing means including a plurality of relays controlled by said computing means and operable according to manifestations of simulated airspeed and altitude to represent a grounded condition of the aircraft, said computing means being operable normally to simulate airborne conditions prior to simulated landing represented by ground altitude, relay controlled means for limiting said pitch indicator to three-point ground position in accordance with decrease in simulated airspeed to simulate lowering of the nose wheel to the runway, means for simulating wheel brakes and additional relay controlled means operable in accordance with said three-point ground representation for establishing an operative connection between said simulated brakes and airspeed meter for simulating deceleration of the aircraft on the runway.

8. In grounded aircraft training apparatus having flight computing means including a plurality of interconnected and interacting servo systems responsive to operation of simulated aircraft controls by a student for representing simulated flight conditions including airspeed, pitch, rate of pitch, roll and altitude respectively, a plurality of simulated flight indicating instruments responsive to said computing means, one of said servo systems representing pitch adapted normally in simulated flight to respond to control quantities representing pitching velocity, means controlled by said computing means and operable according to predetermined manifestations of simulated pitch, rate of pitch and altitude for jointly modifying and limiting the operation of said pitch servo system so as to simulate three-point landing operation of the aircraft on a runway, and means controlled according to roll attitude for further modifying the operation of said pitch servo system for automatically righting the aircraft position in accordance with simulated landing.

9. In grounded aircraft training apparatus having flight computing means including a plurality of interconnected and interacting servo systems responsive to operation of simulated aircraft controls by a student for representing simulated flight conditions including airspeed, rate of yaw, pitch and altitude respectively, a plurality of simulated flight indicating instruments responsive to said computing means, one of said servo systems representing rate of yaw adapted normally in simulated flight to respond to control quantities representing rudder, aileron and engine control, means for simulating right and left wheel brakes and a steerable nose wheel adapted to control said rate of yaw servo system, and means controlled by said computing means and operable according to manifestations of simulated airspeed and altitude with respect to an airfield for operatively connecting said rate of yaw servo system to said brake and nose wheel controls whereby said controls are effective to control said servo system to simulate maneuvering of the aircraft on a runway, said nose wheel control being subject to the operation of another of said servo systems representing pitch whereby simulated three-point grounding of the aircraft is a prerequisite for nose wheel operation.

10. In grounded aircraft training apparatus having flight computing means including a plurality of interconnected and interacting servo systems responsive to operation of simulated aircraft controls by a student for representing simulated flight conditions including airspeed, rate of climb and altitude respectively, a plurality of simulated flight indicating instruments including a rate of climb meter responsive to said computing means, ground sensing means controlled by said computing means, means for simulating landing gear control, means jointly controlled by said sensing means and said simulated landing gear control for actuating alarm means to represent a crash landing when the landing gear is represented as "up," and means jointly controlled by said computing means and sensing means including means operable according to rate of climb for also actuating said alarm means when the aircraft is represented as grounded at excessive vertical airspeed.

11. In grounded aircraft training apparatus having flight computing means responsive to operation of simulated aircraft controls by a student for representing simulated flight conditions including airspeed, rate of climb, pitch and altitude, a plurality of simulated flight indicating instruments responsive to said computing means, and ground sensing means controlled by said computing means for representing a grounded condition of the aircraft according to manifestations of airspeed and altitude, said sensing system including a first relay controlled jointly by voltages from said computing system representing aerodynamic lift, aircraft weight and rate of climb respectively, means controlled according to simulated altitude with respect to an airfield, and a second relay jointly dependent on and controlled by said first relay and said altitude means for affecting the operation of said flight instruments to simulate landing and take-off maneuvers, said first relay being adapted primarily to control said second relay for simulating takeoff and said altitude means being adapted primarily to control said second relay for simulating landing, the flight position of said second relay being independent of the operation of said first relay.

12. In grounded aircraft training apparatus having simulated aircraft controls, flight computing means responsive to the operation of said controls comprising a plurality of interacting servo systems for representing flight conditions respectively including roll and pitch attitudes, a first one of the roll and pitch servo systems having means for deriving a pair of position voltages of opposite sense, the other servo system having selecting means for connecting one of said voltages to the input of the first servo system for positioning of said system according to the sense of the input voltage, and means for representing a grounded condition of the aircraft for controlling the aforesaid voltage connection whereby righting of the aircraft is simulated.

13. In grounded aircraft training apparatus having flight computing means responsive to operation of simulated aircraft controls by a student for representing simulated flight conditions including airspeed and altitude, a plurality of simulated flight indicating instruments responsive to said computing means including an airspeed meter and compass, ground sensing means controlled by said computing means and operable according to manifestations of simulated airspeed and altitude to represent a grounded condition of the aircraft including a brake relay operable according to representations of airspeed and ground contact, and means for simulating wheel brakes controlled by said relay when airspeed is zero and operable when set to prevent operation of said airspeed meter in said grounded condition, said relay also adapted to establish an operative connection between said simulated wheel brakes, airspeed meter and compass for simulating turning of the aircraft on a runway when airspeed exceeds zero.

14. In grounded aircraft training apparatus having simulated aircraft controls, flight computing means responsive to the operation of said controls by a student for representing flight conditions including altitude, rate of pitch and pitch, a plurality of simulated flight indicating instruments including a pitch indicator responsive to said computing means, a first relay response to said computing means according to rate of pitch, a second relay means dependent on the operation of said computing means and operable according to simulated altitude, a switch responsive to said computing means and operable according to pitch attitude for representing nose wheel contact on takeoff and landing maneuvers, and a nose wheel relay operable only in response to concurrent operation of said first and second relays and said switch whereby zero altitude, negative rate of pitch and three-point ground position are simultaneously represented, said nose wheel relay being adapted in one control position to control said flight computing means for limiting negative representations of pitch and pitch rate whereby said pitch indicator represents normal nose wheel contact on the runway, said pitch indicator representing lifting of the nose wheel from the runway during takeoff in another control position of said nose wheel relay.

15. In grounded aircraft training apparatus having flight computing means responsive to operation of simulated aircraft controls by a student for representing simulated flight conditions including aerodynamic lift, vertical air speed and altitude, a plurality of simulated flight indicating instruments responsive to said computing means, and ground sensing means controlled by said computing means for representing by said instruments a grounded condition of the aircraft including a main relay adapted to control said instruments, and two relays separately responsive to said computing means for jointly controlling said main relay, the first separately responsive relay being responsive to a control factor representing altitude and the second being jointly responsive to control factors representing aerodynamic lift, aircraft weight and vertical air speed, means for making said vertical air speed control factor being proportionately greater than the other two factors so as to predominate in the operation of said second relay whereby said main relay is primarily controlled according to lift on simulated take-off and is primarily controlled according to altitude and vertical air speed on simulated landing.

16. In grounded aircraft training apparatus having flight computing means responsive to operation by a student of simulated aircraft controls including an elevator control for representing simulated flight conditions including airspeed, pitch, rate of pitch, angle of attack, and altitude, a plurality of simulated flight indicating instruments including a pitch indicator, altimeter and airspeed meter responsive to said computing means, a relay for simulating the aircraft nose-wheel operation, respective means controlled by said computing means according to simulated pitch, rate of pitch and altitude for jointly controlling the operative position of said relay, said relay being in an operative position only during concurrence of zero or negative values of simulated pitch, rate of pitch and altitude for limiting the pitch computing means during simulated landing maneuvers to a "three-point" landing position and for positioning the angle of attack computing means accordingly, and means controlled by the rate of pitch computing means for rendering said relay inoperative during simulated take-off when the rate of pitch computing means is represented as positive.

17. In grounded aircraft training apparatus having flight computing means responsive to operation of simulated aircraft controls by a student pilot, said computing means including inter-acting electrical systems for representing by voltages simulated flight conditions including airspeed, pitch, rate-of-pitch, rate-of-climb and altitude respectively, a plurality of simulated flight indicating instruments responsive to respective systems of said computing means, a relay responsive to said computing means, said relay being controlled by said computing means jointly by voltages representing respectively a lift manifestation of simulated airspeed, altitude and rate-of-climb, said relay in simulation of take-off being prepared for operation in response to predetermined value of the lift voltage and in simulation of landing in response to the sense of the rate-of-climb voltage and a second relay responsive to voltages representing pitch, rate-of-pitch and altitude for representing nose-wheel operation, said relays adapted to control inter-acting systems of said computing means so as to modify the operation of said flight instruments to simulate landing and take-off maneuvers of the aircraft.

18. In ground-based training apparatus having mock aircraft controls, a mock flight computing and indicating system comprising a plurality of inter-dependent electric systems representing flight factors including air speed, pitch, rate of climb and altitude, the systems representing air speed and pitch being responsive to the operation of a vertical air speed control by a student for jointly producing potential representing components of vertical air speed, the systems representing rate of climb and altitude including indicating instruments and having input circuits connected in parallel for simultaneous energization of said systems according to the rate of climb potential whereby the characteristic response of the rate of climb indicator and altimeter of aircraft can be independently simulated.

19. In ground-based training apparatus having mock aircraft controls, a mock flight computing and indicating system comprising a plurality of inter-dependent electric systems representing flight factors including air speed, pitch, angle of attack, rate of climb and altitude, the systems representing air speed, pitch and angle of attack being responsive to the operation of a vertical air speed control by a student for jointly producing voltages representing components of vertical air speed, the systems representing rate of climb and altitude including indicating instruments and having input circuits connected in parallel for simultaneous energization of said systems according to said voltages whereby the characteristic response of the rate of climb indicator and altimeter of aircraft can be independently simulated.

20. In grounded aircraft training apparatus having flight computing means including a plurality of inter-acting systems and flight indicating instruments controlled by certain of said systems responsive to operation of simulated aircraft controls by a student for representing simulated flight conditions, said computing means including means for producing control quantities representing respectively functions of altitude, rate of climb and vertical force acting on the aircraft, and a ground-sensing system in addition to said inter-acting systems including means operative to represent respectively on-ground and air-borne conditions of the aircraft, means for jointly utilizing said altitude, rate of climb and vertical force control quantities for determining the operative condition of said on-ground and air-borne representing means, and means operatively connecting said on-ground and air-borne representing means to a plurality of said inter-acting flight systems for controlling said systems according to simulated on-ground and air-borne conditions whereby to simulate by indications of said instruments take-off and landing maneuvers.

21. In grounded aircraft training apparatus having flight computing means including a plurality of inter-acting electrical systems and flight indicating instruments controlled by certain of said systems responsive to operation of simulated aircraft controls by a student for representing simulated flight conditions, said computing means including means for producing control quantities representing respectively functions of altitude, rate of climb and vertical force acting on the aircraft, and an electrical ground-sensing system in addition to said inter-acting electrical systems including master relay means operative to alternative positions for representing respectively on-ground and air-borne conditions of the aircraft, means for jointly utilizing said altitude, rate-of-climb and vertical force control quantities for determining the operative condition of said master relay, and means operatively connecting said master relay to a plurality of said inter-acting flight systems for controlling said systems according to simulated on-ground and air-borne conditions whereby to simulate by indications of said instruments take-off and landing maneuvers.

22. In grounded aircraft training apparatus having flight computing means including a plurality of inter-acting electrical systems and flight indicating instruments controlled by certain of said systems responsive to operation of simulated aircraft controls by a student for representing simulated flight conditions, said computing means including means for producing control quantities representing respectively functions of altitude, rate of climb and vertical force acting on the aircraft, and an electrical ground-sensing system in addition to said inter-acting electrical systems comprising master relay means operative to alternative positions for representing respectively on-ground and air-borne conditions of the aircraft, circuitry including a plurality of switches for conjointly controlling the operative condition of said master relay, means for controlling said switches in accordance with the magnitude and sense of said altitude, rate of climb and vertical force control quantities, and means operatively connecting said master relay to a plurality of said inter-acting flight computing systems for controlling said systems according to simulated on-ground and air-borne conditions whereby to simulate by indications of said instruments take-off and landing maneuvers.

23. In grounded aircraft training apparatus having flight computing means responsive to operation of simulated aircraft controls by a student pilot, said computing means including inter-acting electrical systems adapted to produce control quantities representing simulated flight conditions including airspeed, rate of climb and altitude respectively, said computing means also adapted to produce a control quantity representing a function of vertical force acting on the aircraft, a plurality of simulated flight indicating instruments responsive to certain systems of said computing means, and an electrical ground-sensing system in addition to said inter-acting systems comprising a master relay conjointly controlled by said altitude, function of vertical force, and rate of climb control quantities, said relay in simulation of take-off being initially prepared for air-borne operation in response to pre-determined value of the vertical force control quantity and finally in response to an altitude control quantity and in simulation of landing initially in response to a zero altitude control quantity and finally in response to a negative value of rate of climb, and means operatively connecting said master relay to a plurality of said inter-acting systems so as to modify the operation of said flight instruments to simulate on-ground and air-borne conditions of the aircraft during both landing and take-off maneuvers.

24. A grounded aircraft training apparatus having flight computing means including inter-acting electrical systems representing flight conditions responsive to operation of simulated aircraft controls by a student for representing simulated flight conditions including airspeed, rate of climb and altitude, said computing means including means for producing control quantities respresenting functions of altitude, rate of climb and vertical force acting on the aircraft, a plurality of simulated flight indicating instruments responsive to certain of said systems, an electrical ground-sensing system in addition to said inter-acting systems comprising a first circuit-controlling means adapted to be responsive to said altitude system according to simulated altitude with respect to an airfield, other circuit-controlling means connected in circuit with said first circuit-controlling means and responsive to control quantities representing functions of rate of climb and vertical force acting on the aircraft, and a master relay operable to positions representing on-ground and air-borne conditions respectively controlled jointly by said first and other circuit-controlling means, and means operatively connecting said master relay to certain of said inter-acting systems so as to control and modify the operation of said flight instruments to simulate take-off and landing maneuvers.

25. A grounded aircraft training apparatus having flight computing means including inter-acting electrical systems representing flight conditions responsive to operation of simulated aircraft controls by a student for representing simulated flight conditions including airspeed, rate of climb and altitude, said computing means including means for producing control quantities representing functions of altitude, rate of climb and vertical force acting on the aircraft, a plurality of simulated flight indicating instruments responsive to certain of said systems, a first circuit-controlling means adapted to be responsive to said altitude system according to simulated altitude with respect to an airfield, other circuit-controlling means connected in circuit with said first circuit-controlling means and responsive to control quantities representing functions of rate of climb and vertical force acting on the aircraft, and a master relay operable to positions representing on-ground and air-borne conditions respectively controlled jointly by said first and other circuit-controlling means, the circuitry including said first and other circuit-controlling means being arranged so that said master relay is triggered for operation to the air-borne position by initial operation of said other circuit-controlling means, and for operation to the on-ground position by initial operation of said first circuit controlling means, and means operatively connecting said master relay to certain of said inter-acting systems so as to control and modify the operation of said flight instruments to simulate take-off and landing maneuvers.

26. In ground-based training apparatus having mock aircraft controls, a mock flight computing and indicating system comprising a plurality of interacting electrical systems representing respectively flight factors including airspeed, pitch, angle of attack, rate of climb and altitude, the system representing airspeed, pitch, and angle of attack being responsive to operation of an elevator control by a student for jointly producing a plurality of voltages representing components of vertical airspeed, the respective electrical systems representing rate of climb and altitude each including a corresponding indicating instrument and having input circuits arranged to be simultaneously energized by the corresponding vertical airspeed component voltages whereby each system can be adjusted independently of the other so that the characteristic response of the rate of climb indicator and altimeter of aircraft can be independently and realistically simulated.

References Cited in the file of this patent

UNITED STATES PATENTS

| | | |
|---|---|---|
| 1,825,462 | Link | Sept. 29, 1931 |
| 2,099,857 | Link | Nov. 23, 1937 |
| 2,336,603 | Dehmel | Jan. 2, 1945 |
| 2,431,749 | Grant | Dec. 3, 1947 |
| 2,471,966 | Likacs | May 31, 1949 |
| 2,475,355 | Kail | July 5, 1949 |
| 2,485,499 | Lewis | Oct. 18, 1949 |
| 2,510,500 | Hayes et al. | June 6, 1950 |
| 2,584,261 | Davis et al. | Feb. 5, 1952 |